(12) United States Patent
Chang et al.

(10) Patent No.: US 7,749,642 B2
(45) Date of Patent: Jul. 6, 2010

(54) LITHIUM RECHARGEABLE BATTERY WITH FUNCTIONAL CENTER PIN

(75) Inventors: Seok Gyun Chang, Yongin-si (KR); Yoo Eup Hyung, Yongin-si (KR); Jung Seog Kim, Yongin-si (KR); Young Eun Yun, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/470,440

(22) Filed: May 21, 2009

(65) Prior Publication Data

US 2009/0246605 A1 Oct. 1, 2009

Related U.S. Application Data

(62) Division of application No. 11/414,744, filed on Apr. 27, 2006.

(30) Foreign Application Priority Data

May 3, 2005 (KR) .................... 10-2005-0037286

(51) Int. Cl.
*H01M 2/12* (2006.01)
*H01M 10/50* (2006.01)
(52) U.S. Cl. .............................. 429/54; 429/56; 429/62; 429/89
(58) Field of Classification Search ......... 429/122–347, 429/54, 56, 62, 89; 29/623.1–623.5
See application file for complete search history.

(56) References Cited

U.S. PATENT DOCUMENTS

| 1,402,711 | A | * | 1/1922 | Boyle | 169/46 |
| 4,259,656 | A | * | 3/1981 | Smith | 337/407 |
| 4,673,909 | A | * | 6/1987 | Schwob et al. | 337/407 |
| 4,865,793 | A | * | 9/1989 | Suzuki et al. | 264/278 |
| 4,975,341 | A | * | 12/1990 | Tucholski et al. | 429/62 |
| 4,992,339 | A | * | 2/1991 | Georgopoulos | 429/7 |
| 6,632,572 | B1 | * | 10/2003 | Takahashi et al. | 429/326 |
| 6,673,257 | B1 | * | 1/2004 | Hudson | 252/62.3 Q |
| 2002/0006540 | A1 | * | 1/2002 | Enomoto et al. | 429/53 |

FOREIGN PATENT DOCUMENTS

KR 2002-0021065 3/2002

OTHER PUBLICATIONS

Hyung et al., Flame-retardant additives for lithium-ion batteries, Jun. 2003, J. Power Sources, vol. 119-121, pp. 383-387.*
Korean Patent Abstracts, Publication No. 1020020021065 A; Publication Date: Mar. 18, 2002; in the name of Hudson.

* cited by examiner

*Primary Examiner*—Basia Ridley
*Assistant Examiner*—Jonathon G Leong
(74) *Attorney, Agent, or Firm*—Christie, Parker & Hale, LLP

(57) ABSTRACT

Lithium rechargeable batteries having functional center pins are provided. A lithium rechargeable battery has a center pin having a compressed compression spring positioned within a thermal cut-off composition to reduce the void volume inside a bare cell during initial overcharge. The thermal cut-off composition melts at a temperature within a specific temperature range, e.g. between about 80° C. and about 250° C. This prevents the battery from exploding and igniting. Thus, the inventive lithium rechargeable batteries have improved thermal stability.

14 Claims, 13 Drawing Sheets

US 7,749,642 B2

LITHIUM RECHARGEABLE BATTERY WITH FUNCTIONAL CENTER PIN

CROSS-REFERENCE TO RELATED APPLICATION

This application is a divisional application of U.S. patent application Ser. No. 11/414,744, filed Apr. 27, 2006 which claims priority to and the benefit of Korean Patent Application No. 10-2005-0037286, filed on May 3, 2005, in the Korean Intellectual Property Office, the entire content of which is incorporated herein by reference.

FIELD OF THE INVENTION

The present invention relates to a lithium rechargeable battery having a functional center pin. More particularly, the present invention relates to a lithium rechargeable battery having a center pin whose top end and bottom end are blocked with a thermal cut off composition so as to reduce the void volume inside the bare cell at initial overcharge. The thermal cut off composition is molten at temperatures ranging from about 80 to about 250° C. to prevent the battery from exploding and igniting, and to improve the thermal stability of the battery.

BACKGROUND OF THE INVENTION

As generally known in the art, a cylindrical lithium rechargeable battery includes a cylindrical electrode assembly having a center pin, a cylindrical can to which the electrode assembly is coupled, and a cap assembly coupled to the top opening of the can for sealing the can.

Such lithium rechargeable batteries generally have capacities ranging from 2000 to 2400 mA, and have been widely used for notebook PCs, digital cameras, camcorders, and the like, which require electric power with high capacity. Additionally, such rechargeable batteries are connected in series or in parallel to provide a desired voltage or capacity, and take the form of battery packs having predetermined shapes and including safety devices.

In one conventional cylindrical lithium rechargeable battery, an anode plate coated with an anode active material, a separator, and a cathode plate coated with a cathode active material are stacked and one end of the stacked structure is coupled to a bar-shaped winding axis. The structure is then wound into the shape of a cylinder to form an electrode assembly. Next, a center pin is coupled to the electrode assembly and the resultant structure is inserted into a cylindrical can. Then, an electrolyte is injected into the cylindrical can and a cap assembly is coupled to the top of the cylindrical can to complete a substantially cylindrical bare cell.

The cylindrical lithium secondary battery described above also includes a safety device for preventing the battery from exploding upon overcharge. The safety device includes a safety vent capable of deformation upon increases in the internal pressure of the battery due to overcharge. The battery also includes a current interruption device (CID) that interrupts the circuit through the substrate which is deformed due to the deformation of the safety vent. In addition, the battery includes a secondary protection device that interrupts the circuit upon increases in temperature.

Such safety devices operate as follows. When a lithium rechargeable battery is in an overcharged state, the electrolyte in the battery evaporates from the top region of the electrode assembly, thereby increasing electric resistance. Additionally, the central portion of the electrode assembly deforms, resulting in precipitation of lithium. Further, the battery undergoes a rapid increase in temperature because the increased electric resistance at the top region of the electrode assembly causes local heat emission.

Under these circumstances, the internal pressure of the battery rapidly increases due to the additives in the electrolyte, such as cyclohexyl benzene (CHB) and biphenyl (BP). Such additives decompose upon overcharge and generate gas. The increased internal pressure pushes the safety vent (which is part of the cap assembly) out of its place, causing the current interruption device (CID) disposed over the safety device to break, which results in interruption of the electric current. In other words, the printed circuit pattern formed on the CID is broken, thereby interrupting the electric current. Current interruption results in termination of the overcharged state, thereby making it possible to prevent the battery from exploding and igniting. Also, if the internal pressure of the battery is greater than the critical pressure due to overcharge, the safety vent may break, discharging gas to the exterior of the bare cell through an opening in the upper cap plate.

The center pin may be made cylindrical in shape by winding a metal plate. Alternatively, the center pin may originally be formed into an integral cylinder. When the center pin comprises a wound metal plate, the metal plate includes a slit where both ends of the metal plate contact each other. Thus, an electrolyte or gas may be transferred through the slit. When the center pin is an integral cylinder, there is a void volume inside the center pin. The void volume causes delay in the deformation or breakage of the safety vent. The void volume must be reduced in initial overcharge to allow the safety vent to operate promptly and to permit the center pin to serve as a gas discharge path when the internal temperature of the battery reaches 80 to 250° C.

SUMMARY OF THE INVENTION

The present invention addresses the above-mentioned problems. In one embodiment of the present invention, a lithium rechargeable battery has improved safety by including a center pin whose top and bottom ends are blocked with a thermal cut off composition to reduce the void volume in initial overcharge. The thermal cutoff composition permits the safety vent to operate promptly, and the thermal cut-off composition melts when the internal temperature of the battery reaches a predetermined value, thereby permitting the center pin to serve as a gas discharge port.

In one embodiment, such a lithium rechargeable battery includes an electrode assembly having a center pin inserted in its center, a can for housing the electrode assembly, and a cap assembly for sealing the can. The center pin is blocked at its top and bottom ends with a thermal cut off composition. The surface of the thermal cut-off composition may be coated with any one of polyethylene (PE), polypropylene (PP), and polyimide (PI).

According to one embodiment of the present invention, the thermal cut-off composition melts or explodes at a temperature ranging from about 50 to about 250° C. In another embodiment, the thermal cut-off composition melts or explodes at a temperature ranging from about 80 to about 150° C. Therefore, in one embodiment, the thermal cut-off composition may include an organic compound having a melting point ranging from about 80 to about 150° C. Non-limiting examples of such organic compounds include 4-hydroxy-3-methoxybenzaldehyde, 1,3-diphenylbenzene, 1,4-dibromobenzene, triphenylmethane, 4,4'-methylenebis (benzeneamine), diphenylethanedione, pentanedioic acid, n-propyl-4-hydroxybenzoate, xanthene, 3,5-dimethylpyrazole, 1,3-benzenediol, N-phenyl-2-naphthylamine, N-phenylacetamide, 9H-fluorene, m-phenylenedibenzoate, and dihydro-2,5-furanedione.

Additionally, the thermal cut-off composition may include a combination of at least two organic compounds. Nonlimiting examples of organic compounds for use in this embodiment include 2H-1-benzopyran-2-one, n-butylhydroxybenzoate, phenylbenzoate, diphenylphthalate, 4-hydroxy-3-methoxybenzaldehyde, 1,3-diphenylbenzene, 1,4-dibromobenzene, triphenylmethane, 4,4'-methylenebis(benzeneamine), diphenylethanedione, pentadioic acid, n-propylhydroxybenzoate, xanthene, 3,5-dimethylpyrazole, 1,3-benzenediol, N-phenyl-2-naphthylamine, N-phenylacetamide, 9H-fluorene, m-phenylenedibenzoate, dihydro-2,5-furanedione, 2,5-pyrollidinedione, 3-pyridinecarboxamide, phthalic anhydride, p-toluene sulfonamide, dimethyl terephthalate, N-(4-methylphenyl)acetamide, hexanedioic acid, N-phenylbenzamide, 4,4'-dibromobiphenyl, mannitol, 4-(1, 1-dimethylethyl)benzoic acid, N-(2,6-dimethylphenyl)acetamide, 2,4-dinitrobenzeneamine, 7-hydroxy-4-methylcoumarine, 5,5-diethyl-2,4,6(1H,3H,5H)pyrimidinetrione, 1,4-diphenylbenzene, inocitol, 6-phenyl-1,3,5-pyrazine-2,4-diamine, 3,7-dihydro-1,3,7-trimethyl-1H-purine-2,6-dione, 1,1'-bi-2-naphthol, 4-hydroxy-3-methoxybenzoic acid, 2,3-dimethylanthraquinone, 2-phenylindole, 2-methylphenylacetic acid, 2-phenylbenzimidazole, 1,3,5-trimethyl-2,4,6-tris(3,5-di-t-butyl-4-hydroxybenzyl)benzene, hydantoin, 7-hydroxycoumarine, carbanilide, 1,5-dichloroanthraquinone, 1,1,1-tris(4-hydroxyphenyl)ethane, 1-aminoanthraquinone, 2,3,5,6-tetrabromo-p-xylene, 1,5-dihydroxynaphthalene, 2-quinoxalinol, 2,4-diamino-6-methyl-1,3,5-triazine, 7-chloro-4-hydroxyquinoline, alizarine, anthraquinone, 2,4-diamino-6-hydroxypyrimidine, 2-phenylbenzimidazole, 2-amino-4-hydroxy-6-methylpyrimidine, 4-amino-2,6-dihydroxypyrimidine, 2-amino-4,6-dihydroxypyrimidine and uracil. In one embodiment, the thermal cut-off composition is non-conductive.

According to one embodiment of the present invention, the center pin includes a body having a predetermined length which is open at its top and bottom ends. The center pin also includes a blocker including a thermal cut-off composition, blocking the top and bottom ends of the body. The thermal cutoff composition melts or explodes at a predetermined temperature. The body may be formed of any suitable material such as steel, stainless steel or aluminum. Also, the body may have tapered portions at its top and bottom ends. The blocker may be an envelope shaped film that surrounds the body, including the top and bottom ends of the body. Alternatively, the blocker may be a lid that blocks the top and bottom ends of the body. The body may further include a gasifier disposed inside the body which decomposes at a predetermined voltage range to generate gas. Nonlimiting examples of suitable materials for the gasifier include cyclohexyl benzene (CHB) and biphenyl (BP). In addition, the body may further include a flame retardant, which includes at least one material selected from the group consisting of magnesium hydroxide-based materials, aluminum hydroxide-based materials and phosphate-based materials.

In another embodiment of the present invention, a lithium rechargeable battery includes an electrode assembly having a center pin inserted in its center, a can for housing the electrode assembly, and a cap assembly for sealing the can. The center pin includes a compressed compression spring inserted into a thermal cut-off composition, a body surrounding the compression spring, and lids for blocking the top and bottom ends of the body. The surface of thermal cut-off composition may be coated with any suitable material, such as polyethylene (PE), polypropylene (PP), or polyimide (PI). The thermal cut-off composition melts or explodes at a temperature ranging from about 50 to about 250° C. In another embodiment, the thermal cut-off composition melts or explodes at a temperature ranging from about 80 to about 150° C. The thermal cut-off composition includes an organic compound. Nonlimiting examples of suitable organic compounds include 4-hydroxy-3-methoxybenzaldehyde, 1,3-diphenylbenzene, 1,4-dibromobenzene, triphenylmethane, 4,4'-methylenebis(benzeneamine), diphenylethanedione, pentanedioic acid, n-propyl-4-hydroxybenzoate, xanthene, 3,5-dimethylpyrazole, 1,3-benzenediol, N-phenyl-2-naphthylamine, N-phenylacetamide, 9H-fluorene, m-phenylenedibenzoate, and dihydro-2,5-furanedione. Alternatively, the thermal cut-off composition may include a combination of at least two organic compounds. Nonlimiting examples of suitable organic compounds for use in this embodiment include 2H-1-benzopyran-2-one, n-butyl-4-hydroxybenzoate, phenylbenzoate, diphenylphthalate, 4-hydroxy-3-methoxybenzaldehyde, 1,3-diphenylbenzene, 1,4-dibromobenzene, triphenylmethane, 4,4'-methylenebis(benzeneamine), diphenylethanedione, pentadioic acid, n-propyl-4-hydroxybenzoate, xanthene, 3,5-dimethylpyrazole, 1,3-benzenediol, N-phenyl-2-naphthylamine, N-phenylacetamide, 9H-fluorene, m-phenylenedibenzoate, dihydro-2,5-furanedione, 2,5-pyrollidinedione, 3-pyridinecarboxamide, phthalic anhydride, p-toluene sulfonamide, dimethyl terephthalate, N-(4-methylphenyl)acetamide, hexanedioic acid, N-phenylbenzamide, 4,4'-dibromobiphenyl, mannitol, 4-(1, 1-dimethylethyl)benzoic acid, N-(2,6-dimethylphenyl)acetamide, 2,4-dinitrobenzeneamine, 7-hydroxy-4-methylcoumarine, 5,5-diethyl-2,4,6(1H,3H,5H)-pyrimidinetrione, 1,4-diphenylbenzene, inocitol, 6-phenyl-1,3,5-pyrazine-2,4-diamine, 3,7-dihydro-1,3,7-trimethyl-1H-purine-2,6-dione, 1,1'-bi-2-naphthol, 4-hydroxy-3-methoxybenzoic acid, 2,3-dimethylanthraquinone, 2-phenylindole, 2-methylphenylacetic acid, 2-phenylbenzimidazole, 1,3,5-trimethyl-2,4,6-tris(3,5-di-t-butyl-4-hydroxybenzyl)benzene, hydantoin, 7-hydroxycoumarine, carbanilide, 1,5-dichloroanthraquinone, 1,1,1-tris(4-hydroxyphenyl)ethane, 1-aminoanthraquinone, 2,3,5,6-tetrabromo-p-xylene, 1,5-dihydroxynaphthalene, 2-quinoxalinol, 2,4-diamino-6-methyl-1,3,5-triazine, 7-chloro-4-hydroxyquinoline, alizarine, anthraquinone, 2,4-diamino-6-hydroxypyrimidine, 2-phenylbenzimidazole, 2-amino-4-hydroxy-6-methylpyrimidine, 4-amino-2,6-dihydroxypyrimidine, 2-amino-4,6-dihydroxypyrimidine and uracil.

The lids have a degree of strength such that the lids are opened or broken by the restoration force of the compression spring. The lids may be formed of a polymer resin. The body may further include a gasifier disposed inside the body which decomposes at a predetermined voltage range to generate gas. Nonlimiting examples of suitable materials for the gasifier include cyclohexyl benzene (CHB) and biphenyl (BP). In addition, the body may further include a flame retardant, which includes at least one material selected from the group consisting of magnesium hydroxide-based materials, aluminum hydroxide-based materials and phosphate-based materials.

Insertion of the compression spring into the thermal cut-off composition may be accomplished by insert injection molding. Further, the surface of the thermal cut-off composition may be coated with any suitable material, such as polyethylene (PE), polypropylene (PP), or polyimide (PI).

The center pin may have indentations, each indentation being spaced apart from the top and bottom ends of the main body by a predetermined distance. These indentations enable fixation of the blocker. In another embodiment, the center pin may include a body having a predetermined length and open top and bottom ends, lids for blocking the top and bottom ends of the body, and a sealing member between the lid and each of the top and bottom ends to seal the body. The sealing member includes a thermal cut-off composition which melts or explodes at a predetermined temperature.

The lids may be formed of polymer resins. The thermal cut-off composition melts at a temperature ranging from about 50 to about 250° C. In another embodiment, the thermal cut-off composition melts at a temperature ranging from about 80 to about 150° C.

BRIEF DESCRIPTION OF THE DRAWINGS

The above and other objects, features and advantages of the present invention will become more apparent with reference to the following detailed description when considered in conjunction with the accompanying drawings, in which.

DETAILED DESCRIPTION OF THE PREFERRED EMBODIMENTS

Exemplary embodiments of the present invention will now be described with reference to the accompanying drawings.

Figure 1:
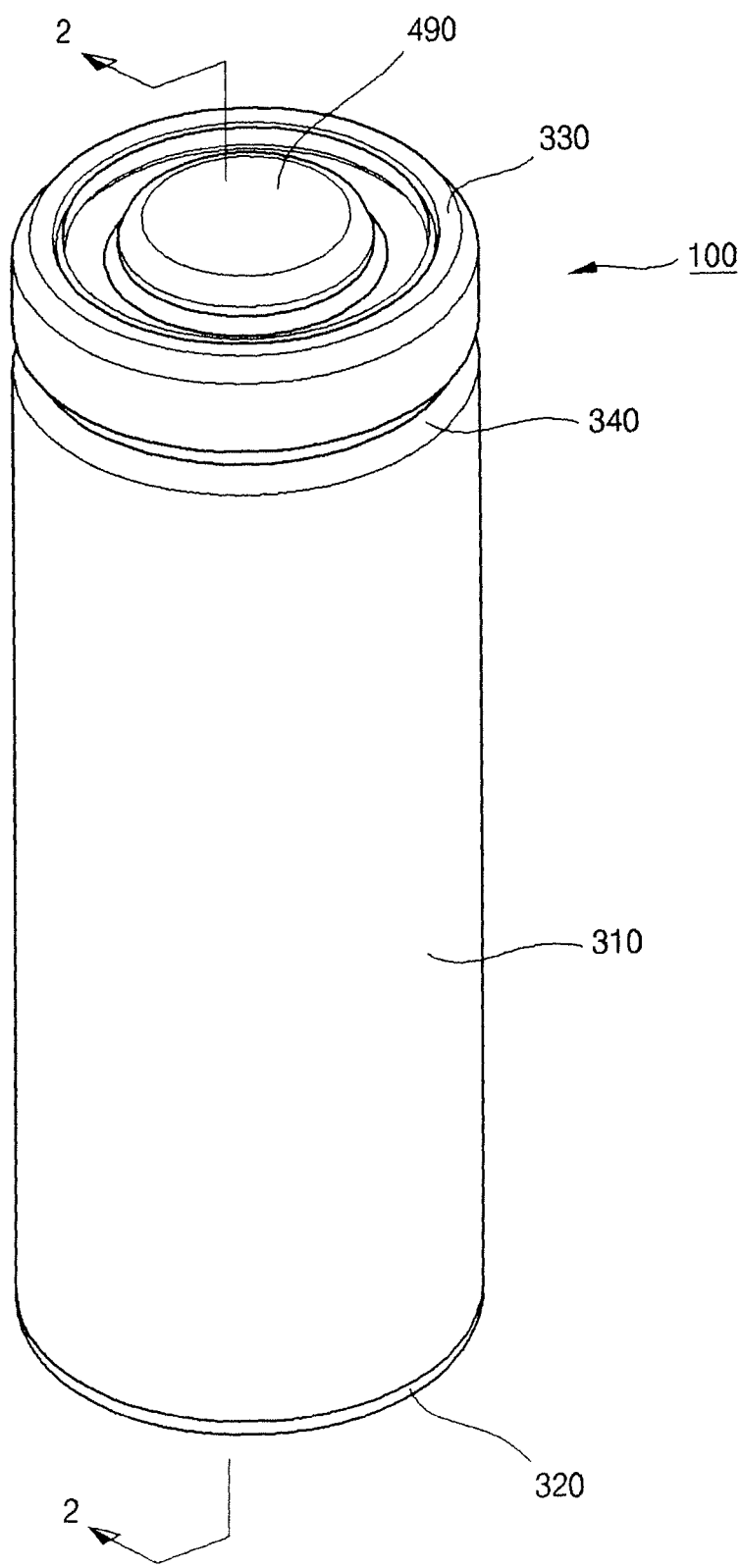
FIG. 1 is a perspective view of a lithium rechargeable battery according to one embodiment of the present invention.
Figure 2:
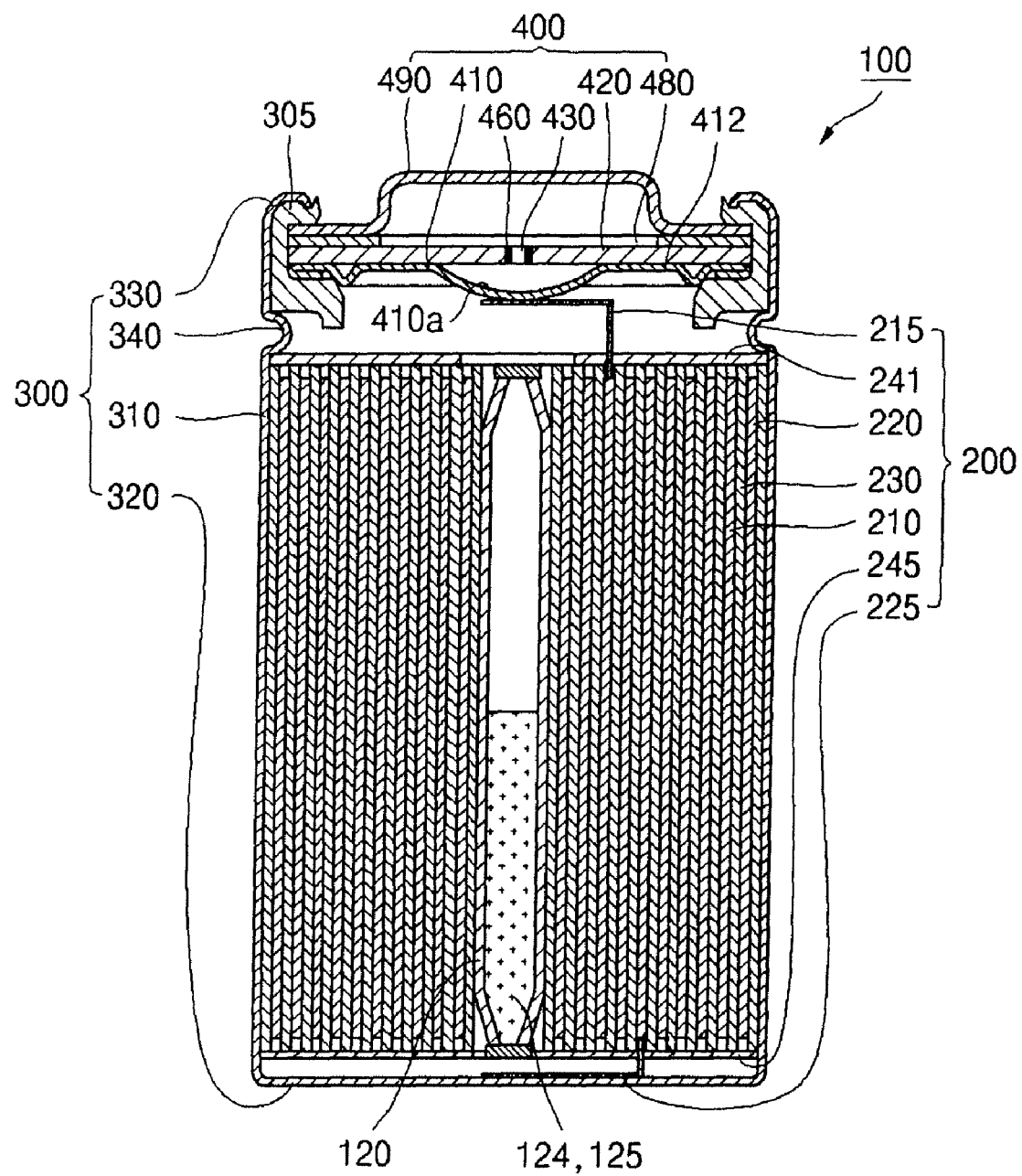
FIG. 2 is a sectional view of the battery of FIG. 1, taken along line 2-2.

As shown in FIGS. 1 and 2, a lithium rechargeable battery 100 according to one embodiment of the present invention includes an electrode assembly 200 having a center pin 120, a cylindrical can 300 for housing the electrode assembly 200 and an electrolyte, and a cap assembly 400 coupled to the top of the cylindrical can 300 to seal the cylindrical can 300 and to permit electric current generated from the electrode assembly 200 to flow toward an external device. The lithium rechargeable battery 100 may be cylindrical in shape as shown in FIG. 1. Alternatively, the lithium rechargeable battery 100 may be prismatic in shape or may be large in size such as a battery for a HEV (hybrid electric vehicle). Additionally, the thermal cut-off composition according to one embodiment of the present invention may function under high-temperature environments, enabling use of the battery as a high-capacity battery, a battery for special use (high-temperature application), or a power source for a marine container box. Therefore, there is no particular limitation in the shape or type of the lithium rechargeable battery 100.

The electrode assembly 200 comprises a cathode plate 210 having a cathode current collector coated with a cathode active material layer, an anode plate 220 having an anode current collector coated with an anode active material layer, and a separator 230 positioned between the cathode plate 210 and the anode plate 220. The separator 230 electrically insulates the cathode plate 210 and the anode plate 220. The electrode assembly is wound into a jelly-roll shape. The cathode plate 210 includes a cathode current collector comprising a thin metal plate having excellent conductivity, for example aluminum (Al) foil. Although not shown in the drawings, cathode active material layers are coated on both surfaces of the collector. The cathode plate 210 has non-coated portions at both ends. The non-coated portions are not coated with cathode active material. A cathode tab 215, generally made of aluminum (Al), protrudes from the top of the electrode assembly 200 by a predetermined length and is joined to a non-coated portion at one end of the cathode plate 210.

Additionally, the anode plate 220 includes an anode current collector comprising a conductive thin metal plate, for example copper (Cu) or nickel (Ni) foil. Anode active material layers are coated on both surfaces of the collector. The anode plate 220 has non-coated portions at both ends. The non-coated portions are not coated with anode active material. An anode tab 225, generally made of nickel (Ni) protrudes from the bottom of the electrode assembly 200 by a predetermined length and is joined to a non-coated portion at one end of the anode plate.

The electrode assembly 200 further includes insulation plates 241 and 245 at the top and bottom of the assembly 200. The insulation plates prevent the electrode assembly 200 from contacting the cap assembly 400 or the cylindrical can 300.

The cylindrical can 300 includes a cylindrical lateral side plate 310, which has a predetermined diameter to provide space for housing the cylindrical electrode assembly 200. The can also includes a bottom plate 320 for sealing the bottom of the cylindrical lateral side plate 310. The cylindrical lateral side plate 310 is open at its top so that the electrode assembly 200 can be inserted into the cylindrical can 300. The anode tab 225 of the electrode assembly 200 is coupled to the center of the bottom plate 320 of the cylindrical can 300 so that the cylindrical can 300 can serve as an anode. Additionally, the cylindrical can 300 may be formed of aluminum (Al), iron (Fe) or alloys thereof. Further, the top of the cylindrical can 300 has a crimped portion 330 that is bent inwardly to press against the top of the cap assembly 400, which is coupled to the top opening. The cylindrical can 300 further includes a channel 340 in which a portion of the can 300 is indented inwardly to press against the bottom portion of the cap assembly 400. The channel 340 is located beneath the crimped portion 330 by a distance corresponding to the thickness of the cap assembly.

The cap assembly 400 includes a safety vent 410, a current interruption device 420, a secondary protection device 480 and an upper cap plate 490. The safety vent 410 is generally plate-shaped and has a protrusion 410a protruding downwardly. The safety vent 410 is disposed at the bottom of the cap assembly 400. The protrusion 410a may deform upwardly due to pressure generated inside the rechargeable battery. An electrode tab extending from either the cathode plate 210 or the anode plate 220 is fixed to a predetermined position on the bottom surface of the safety vent 410. For example, the electrode tab 215 extending from the cathode plate 210 is welded to the bottom surface of the safety vent 410 to electrically connect the safety vent 410 to the cathode plate 210. The remaining electrode tab, for example the electrode tab extending from the anode plate, is electrically connected to the can 300 for example by welding to the bottom surface 320 of the can. The safety vent 410 deforms or breaks when the internal pressure of the can 300 increases, thereby breaking the current interruption device 420 and interrupting electric current. Further, the secondary protection device 480 is disposed on the current interruption device 420 and interrupts electric current upon an over-current state. In addition, the conductive upper cap plate 490 is disposed on the secondary protection device 480 in order to supply the cathode voltage and anode voltage to an external device.

The center pin 120 is inserted into the central portion of the electrode assembly 200. The center pin 120 has several functions. First, the electrode assembly 200 swells during repeated charge/discharge cycles of the lithium ion battery, but the confines of the can prevent such swelling from occurring near the sides of the cane. Thus, the electrode assembly 200 swells near its center, causing deformation of the electrode plates and short circuits. The center pin 120 prevents such deformation of the electrode plates. Also, when the battery reaches a high internal temperature due to overcharge, etc., a large amount of gas is generated in the battery. The center pin 120 serves as a path for discharging the gas. In general, the center pin 120 is formed by winding a thin metal plate. The metal plate may be any suitable material taking into consideration the manufacturing cost and gas discharge efficiency of the material. The metal plate has a slit at its end. Alternatively, the center pin 120 is originally formed in the shape of a cylinder having no slit.

According to one embodiment of the present invention, a thermal cut-off composition is used as a blocker for the center pin 120. The center pin 120 is coupled near the center of the electrode assembly 200, and inhibits deformation of the electrode assembly during charge/discharge cycles of the battery. Additionally, because the center pin 120 is blocked at its top and bottom ends, the void volume inside the can 300 is minimized. In contrast, center pins according to the prior art are open at the top and bottom ends, and thus the inner part of the center pin constitutes void volume.

The thermal cut-off composition includes a material that is dissolved or deformed at a specific temperature or under other specific conditions. Thus, the thermal cutoff composition can change the operating conditions of a heat insulating structure. Particularly, a mixture containing at least two organic compounds having a known melting point has improved thermal properties and quality compared to the individual organic compounds, as long as the compounds are mixed or combined with each other. The product obtained from the combination of at least two organic compounds has a melting point lower than the melting point of either organic compound. The difference in the melting point between the compounds before mixing and the product after mixing is about 5° C. or more. In other words, the resultant thermal cut-off composition has a melting point lower than the melting point of either organic compound by at least 5° C. Such a decrease in the melting point does not depend on the means used for combining the compounds, which can include blending, co-precipitation, co-crystallization, or the like. In addition to a lower melting point, the thermal cut-off composition shows excellent chemical and thermal stability. Further, the thermal cut-off composition is electrically non-conductive before and after melting. The blocker including the thermal cut-off composition is non-conductive in order to prevent an internal short circuit caused by external impact, etc. The blocker may further include a film surrounding the center pin 120, or lids blocking the top and bottom ends of the center pin 120.

Instead of a combination of at least two organic compounds, an organic compound having a melting point ranging from about 80 to about 150° C. may be used as the blocker for the center pin 120. In this embodiment, the range of melting points is broader than that of the combination of at least two organic compounds. For example, as shown in the following Table 1, 1,3-diphenylbenzene has a melting point ranging from about 84 to about 88° C. Hence, it is difficult to obtain an accurate melting point. However, the blocker does not need an accurate melting point, and no serious problem occurs when the melting point ranges from about 80° C. to about 150° C. In fact, such a range is important for causing deformation of the safety vent. Therefore, an organic compound satisfying the aforementioned condition can be used alone as the blocker. As shown in Table 1 below, nonlimiting examples of such organic compounds include 4-hydroxy-3-methoxybenzaldehyde, 1,3-diphenylbenzene, 1,4-dibromobenzene, triphenylmethane, 4,4'-methylenebis(benzeneamine), diphenylethanedione, pentanedioic acid, n-propylhydroxybenzoate, xanthene, 3,5-dimethylpyrazole, 1,3-benzenediol, N-phenyl-2-naphthylamine, N-phenylacetamide, 9H-fluorene, m-phenylene dibenzoate, dihydro-2,5-furanedione, and the like. Nonlimiting examples of suitable organic compounds for use in the present invention are shown in Table 1 below.

TABLE 1

| Compound | CAS registration No. | Melting point range (° C.) | Molecular weight (g/mol) |
|---|---|---|---|
| 2H-1-benzopyrane-2-one | 91-94-5 | 68-70 | 146 |
| n-butyl-4-hydroxybenzoate | 94-26-8 | 68-69 | 194 |
| Phenyl benzoate | 93-99-2 | 69-72 | 198 |
| Diphenyl phthalate | 84-62-8 | 74-76 | 318 |
| 4-hydroxy-3-methoxyxbenzaldehyde | 121-33-5 | 81-83 | 152 |
| 1,3-diphenylbenzene | 92-06-8 | 84-88 | 230 |
| 1,4-dibromobenzene | 106-37-6 | 87-89 | 235 |
| Triphenylmethane | 519-73-3 | 92-94 | 244 |
| 4,4'-methylene bis(benzeneamine) | 101-77-9 | 89-91 | 198 |
| Diphenylethanedione | 134-81-6 | 94-95 | 210 |
| Pentanedioic acid | 110-94-1 | 95-98 | 132 |
| n-propyl-4-hydroxybenzoate | 94-13-3 | 95-98 | 180 |
| Xanthene | 92-83-1 | 101-102 | 188 |
| 3,5-dimethylpyrazole | 67-51-6 | 107-109 | 96 |
| 1,3-benzenediol | 108-46-3 | 110-113 | 110 |
| N-phenyl-2-naphthylamine | 135-88-6 | 107-109 | 219 |
| N-phenylacetamide | 103-84-4 | 113-115 | 135 |
| 9H-fluorene | 85-73-7 | 114-116 | 166 |
| m-phenylene dibenzoate | 94-01-9 | 117 | 318 |
| Dihydro-2,5-furanedione | 108-30-5 | 119-120 | 100 |
| 2,5-pyrrolidinedione | 123-56-8 | 123-125 | 99 |
| 3-pyridinecarboxamide | 98-92-0 | 130-132 | 122 |
| Phthalic anhydride | 85-44-9 | 131-134 | 148 |
| p-toluene sulfonamide | 70-55-3 | 138-139 | 171 |
| Dimethyl terephthalate | 120-61-6 | 140-142 | 194 |
| N-(4-methylphenyl)acetamide | 103-89-9 | 149-151 | 149 |
| hexanedioic acid | 124-04-9 | 152-154 | 146 |
| N-phenylbenzamide | 93-98-1 | 164-166 | 197 |
| 4,4'-dibromobiphenyl | 92-86-4 | 167-170 | 312 |
| Mannitol | 69-65-8 | 167-170 | 182 |
| 4-(1,1-dimethylethyl)benzoic acid | 96-73-7 | 165-167 | 178 |
| N-(2,6-dimethylphenyl)-acetamide | 2198-53-0 | 182-184 | 163 |
| 2,4-dinitrobenzeneamine | 606-22-4 | 137-139 | 183 |
| 7-hydroxy-4-methylcoumarine | 90-33-5 | 190 | 176 |
| 5,5-diethyl-2,4,6(1H,3H,5H)-pyrimidinetrione | 57-44-3 | 189-191 | 184 |

TABLE 1-continued

| Compound | CAS registration No. | Melting point range (° C.) | Molecular weight (g/mol) |
|---|---|---|---|
| 1,4-diphenylbenzene | 92-94-4 | 212-213 | 230 |
| Inocitol | 87-89-8 | 224-225 | 180 |
| 6-phenyl-1,3,5-triazine-2,4-diamine | 91-76-9 | 226-228 | 187 |
| 2-phenylbenzimidazole | 716-79-0 | 293-296 | 194 |
| 3,7-dihydro-1,3,7-trimethyl-1H-purine-2,6-dione | 58-08-2 | 232-236 | 194 |
| 1,1'-bi-2-naphthol | 602-09-5 | 214-217 | 286 |
| 4-hydroxy-3-methoxybenzoic acid | 121-34-6 | 209-213 | 168 |
| 2,3-dimethylanthraquinone | 6531-35-7 | 210-212 | 236 |
| 2-phenylindole | 948-65-2 | 188-190 | 193 |
| 2-methylphenylacetic acid | 644-36-0 | 88-90 | 150 |
| 1,3,5-trimethyl-2,4,6-tris(3,5-di-t-butyl-4-hydroxybenzyl)benzene | 1709-70-2 | 248-250 | 774 |
| Hydantoin | 461-72-3 | 221-223 | 100 |
| 7-hydroxycoumarine | 93-35-6 | 230 | 162 |
| Carbanilide | 102-07-8 | 239-241 | 212 |
| 1,5-dichloroanthraquinone | 82-46-2 | 245-247 | 277 |
| 1,1,1-tris(4-hydroxyphenyl)ethane | 27955-94-8 | 245-248 | 306 |
| 1-aminoanthraquinone | 82-45-1 | 253-255 | 223 |
| 2,3,5,6-tetrabromo-p-xylene | 23488-38-2 | 254-256 | 422 |
| 1,5-dihydroxynaphthalene | 83-56-7 | 259-261 | 160 |
| 2-quinoxalinol | 1196-57-2 | 271-272 | 146 |
| 2,4-diamino-6-methyl-1,3,5-triazine | 542-02-9 | 274-276 | 125 |
| 7-chloro-4-hydroxyquinoline | 86-99-7 | 276-279 | 180 |
| Alizarine | 72-48-0 | 279-284 | 240 |
| Anthraquinone | 84-65-1 | 284-286 | 208 |
| 2,4-diamino-6-hydroxy-pyrimidine | 56-06-4 | 285-286 | 126 |
| 2-phenylbenzimidazole | 716-79-0 | 296 | 194 |
| 2-amino-4-hydroxy-6-methylpyrimidine | 3977-29-5 | >300 | 125 |
| 4-amino-2,6-dihydroxy-pyrimidine | 873-83-6 | >300 | 127 |
| 2-amino-4,6-dihydroxy-pyrimidine | 56-09-7 | >300 | 127 |
| Uracil | 66-22-8 | >300 | 112 |

In one example, 14 to 16 wt % of 7-hydroxy-4-methylcoumarine is mixed with N-phenylacetamide in a high-speed grinding and rolling mixer for 5 minutes to obtain a combination of at least two organic compounds. After analyzing the resultant composition with a differential scanning calorimeter (DSC), the composition shows a melting point of about 102° C.

In another example, 14 to 16 wt % of N-(4-methylphenyl)acetamide is mixed with 4-hydroxy-3-methoxybenzaldehyde in a high-speed grinding and rolling mixer for 5 minutes. After analyzing the resultant composition with a differential scanning calorimeter, the composition shows a melting point of about 72° C.

Figure 3A:
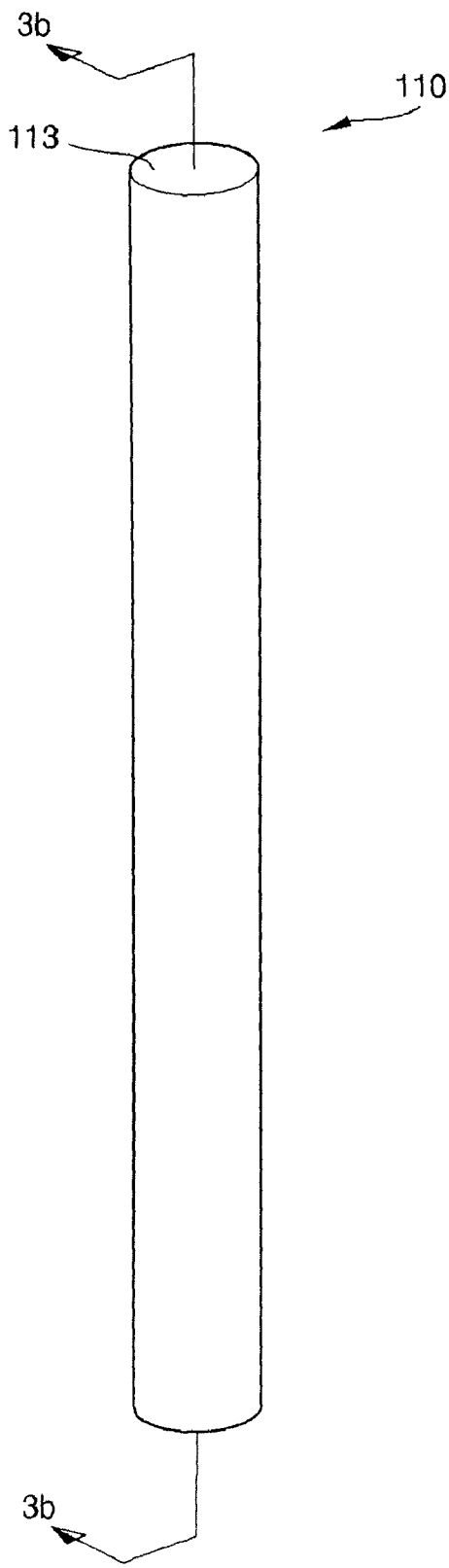
FIG. 3a is a perspective view of a center pin according to one embodiment of the present invention.
Figure 3B:
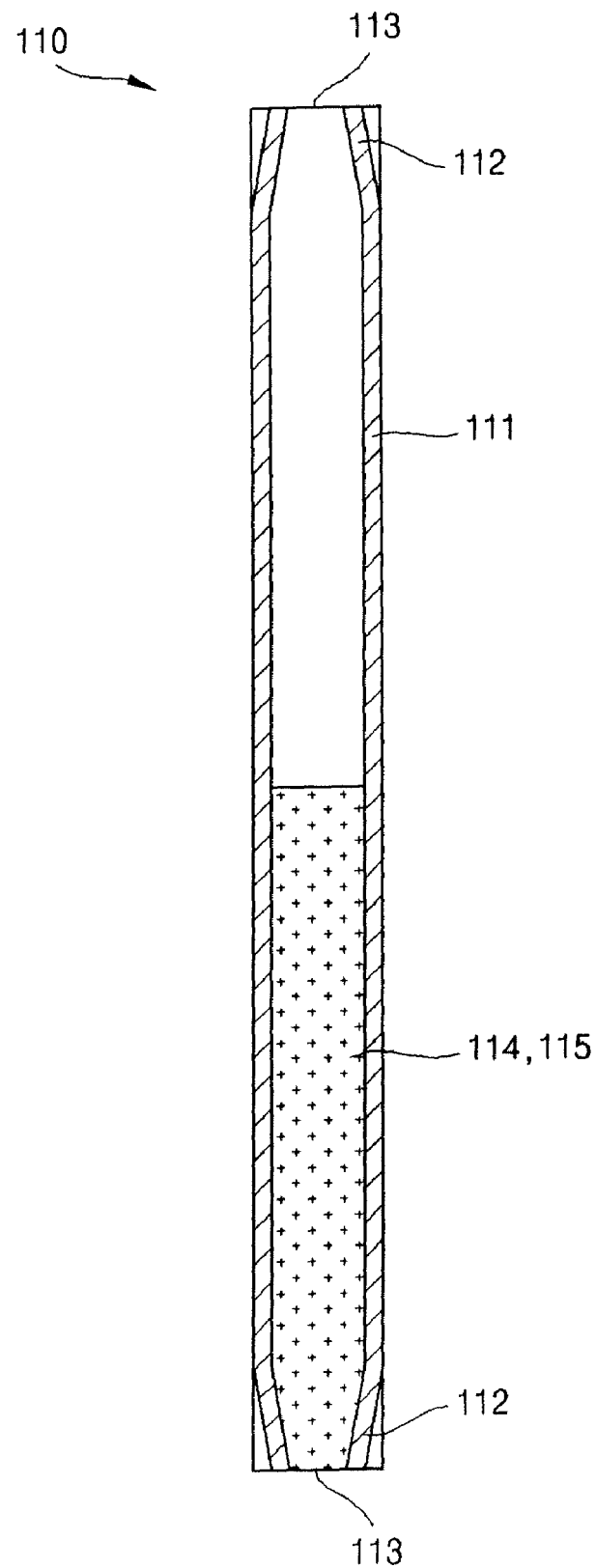
FIG. 3b is a sectional view of the center pin of FIG. 3a, taken along line 3b-3b.
Figure 4A:
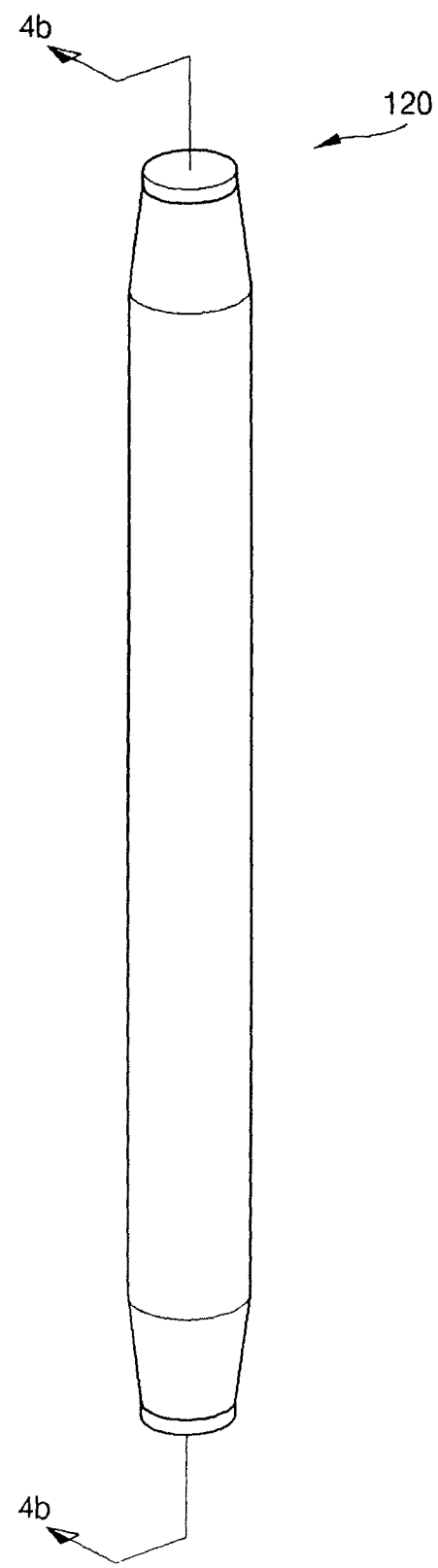
FIG. 4a is a perspective view of a center pin according to another embodiment of the present invention.
Figure 4B:
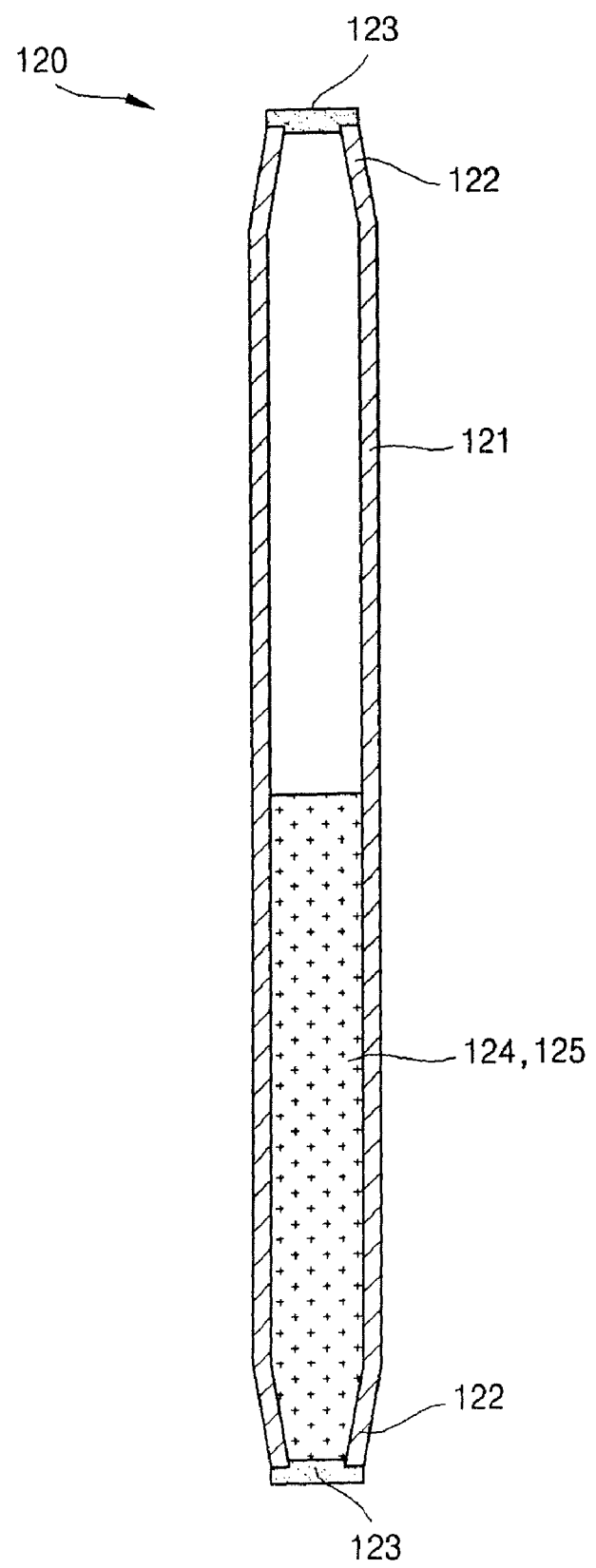
FIG. 4b is a sectional view of the center pin of FIG. 4a, taken along line 4b-4b.

As shown in FIGS. 3b and 4b, the center pin 110 or 120 includes a body 111 or 121 with a predetermined length, which is open at its top and bottom ends. A blocker 113 or 123 containing a thermal cut-off composition blocks the top and bottom ends of the body, and the thermal cut-off composition melts or explodes at a specific temperature. Since the thermal cut-off composition may include a material capable of dissolving in the electrolyte, the surface of the thermal cut-off composition can be coated with a material that is not soluble in the electrolyte. Nonlimiting examples of suitable materials for coating the thermal cut-off composition include polyethylene (PE), polypropylene (PP) and polyimide (PI). The coating layer may be a very thin coating layer having a thickness sufficient to prevent the thermal cut-off composition from directly contacting the electrolyte.

The body 111 or 121 is strong enough to prevent deformation of the electrode assembly 200. Nonlimiting examples of suitable materials for the body include steel, stainless steel and aluminum. Additionally, the center pin 110 or 120 may be tapered 112 or 122 at its top and bottom ends. When the center pin 110 or 120 is deformed by external impact, the top and bottom ends are deformed more easily than the central portion of the center pin. The tapered portions 112 or 122, which have diameters smaller than the diameter of the central portion, minimize such deformation.

Referring to FIGS. 3a and 3b, the blocker 113 may include a film that substantially surrounds the body 111 including the top and bottom ends. The blocker 113 includes a material that melts or explodes at a specific temperature. According to one embodiment of the present invention, a thermal cut-off composition is used to control the melting point. More particularly, the blocker 113 melts or explodes when the battery reaches an internal temperature ranging from about 80 to about 150° C., so that the top and bottom ends of the body 111 forming the center pin 110 are open. As a result, the center pin 110 according to this embodiment of the present invention has a significantly reduced void volume due to the blockage of the top and bottom ends in the initial stage of overcharge. This permits prompt operation of the safety vent 410. However, when the internal temperature of the battery reaches between about 80 and about 150° C., there is a risk that the battery will explode or ignite. In this situation, the blocked center pin 110 provides minimal relief. In such a situation, the center pin should function as a chimney, allowing the gas generated by the decomposition of the cyclohexyl benzene (CHB), biphenyl (BP) or the like (which is contained in the electrolyte) to be concentrated at the safety vent 410 along the body 111 of the center pin 110.

The body 111 may further include a gasifier 114 disposed inside the body. The gasifier 111 decomposes at a predetermined voltage range to generate gas. The gasifier 114 generally decomposes and gasifies when the battery is in an overcharged state, i.e. when the voltage of the battery is about 4 to about 4.5V or greater. Nonlimiting examples of suitable materials for the gasifier include cyclohexyl benzene (CHB), biphenyl (BP), or the like, which are also used in the electrolyte. Cyclohexyl benzene (CHB), biphenyl (BP), or the like, contained in the electrolyte may adversely affect the lifespan of the battery. However, because the gasifier 114 formed inside the center pin 110 does not react with the electrolyte in a normal state, the gasifier can include such materials. In other words, if the safety vent 410 becomes deformed, the battery becomes useless. Hence, there is no particular limitation in the material forming the gasifier 114, as long as the material generates a large amount of gas.

In addition to the gasifier 114, the body 111 may further include a flame retardant 115. The flame retardant 115 is mixed with the gasifier 114 and then inserted into the body along with the gasifier. Alternatively, the flame retardant 115 is packed into the body alone under high pressure. The flame retardant 115 significantly decreases the risk of battery ignition. Nonlimiting examples of suitable materials for use as the flame retardant 115 include magnesium hydroxide-based materials, aluminum hydroxide-based materials, phosphate-based materials, and the like.

Referring to FIGS. 4a and 4b, the blocker 123 may include lids that block the top and bottom ends of the body 121. In other words, a lid-shaped blocker is coupled to each of the top and bottom ends of the body 121. Similarly, the body 121 may include a gasifier 124 and a flame retardant, as described above. When the battery reaches an internal temperature of about 80 to about 150° C., the blocker 123 melts or explodes and the gasifier 124 and the flame retardant 125 are transferred to the electrolyte and the electrode assembly 200, thereby enabling prompt operation of the safety vent, interrupting the overcharged state and inhibiting battery ignition.

A center pin according to another embodiment of the present invention will now be described with reference to FIGS. 5, 6 and 7.

Figure 5:
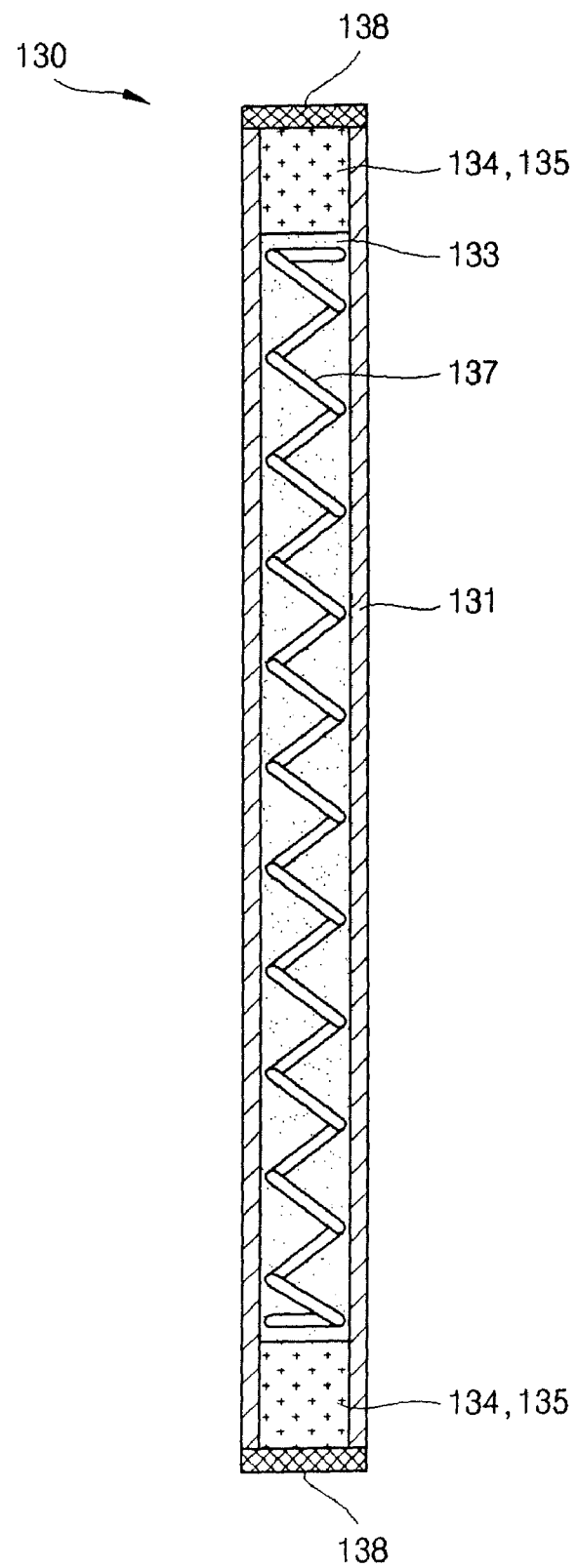
FIG. 5 is a sectional view of a center pin according to still another embodiment of the present invention.
Figure 6:
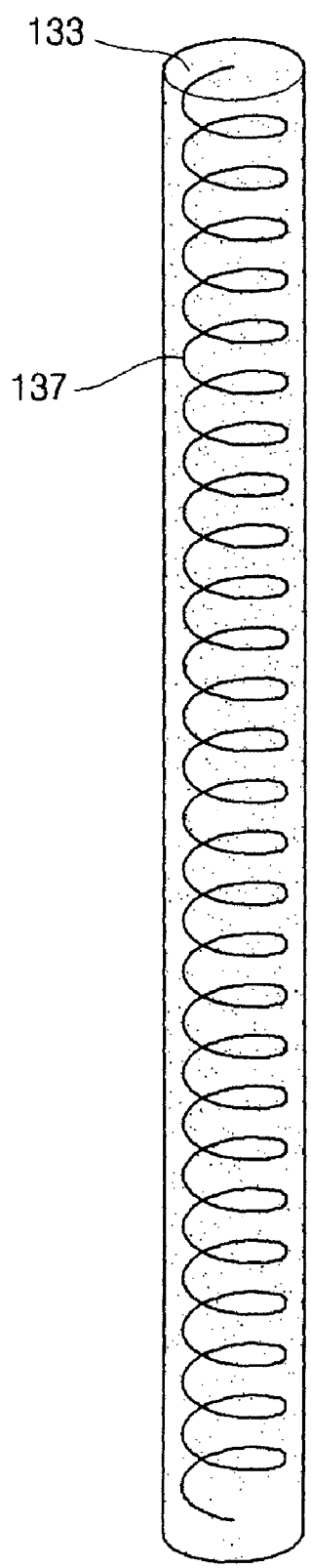
FIG. 6 is a perspective view of a thermal cut-off composition, in which a compression spring is inserted.

Referring to FIG. 5, the lithium rechargeable battery includes an electrode assembly 200 having a center pin inserted in its center, a can 300 for housing the electrode assembly 200, and a cap assembly for sealing the can 300. The center pin 130 may include a compressed compression spring 137 inserted into a thermal cut-off composition 133, a body 131 surrounding the compression spring 137, and lids for blocking the top and bottom ends of the body 131. The surface of the thermal cut-off composition 133 may be coated with a material that is not soluble in the electrolyte. Nonlimiting examples of suitable such materials include polyethylene (PE), polypropylene (PP) and polyimide (PI).

In particular, lids 138 can comprise a polymer resin strong enough that the lids can be opened or broken by the restoration force of the compression spring 137. If the lids 138 are too weak, they cannot block the top and bottom ends of the center pin 130. If the lid 138 is too strong, the lids 138 cannot be opened or broken, even when the compression spring expands after the internal temperature of the battery reaches between about 80 and about 150° C. and the thermal cut-off composition melts. Thus, when the lids are too strong, the safety vent 410 is not deformed in due time.

The thermal cut-off composition 133 should have a melting point ranging from about 80 to about 150° C. The thermal cut-off composition may include an organic compound, such as those described in Table 1, alone or in combination.

Like the center pin 120, the center pin 130 may also include a gasifier 134 and a flame retardant 135. The thermal cut-off composition 133 with the compression spring 137 is inserted in the center of the center pin 130. FIG. 6 is a perspective view of the thermal cut-off composition 133 with the compression spring 137. The compression spring 137 is inserted into the thermal cut-off composition 133 by insert injection molding, in which the compression spring 137 is introduced into a mold and the thermal cut-off composition is pushed into the mold in a molten state using an injector. The compression spring 137 is inserted into the thermal cut-off composition 133 in its compressed state. The modulus of elasticity of the compression spring 137 should have an upper limit value in which the thermal cut-off composition 137 surrounding the compressed compression spring is not broken. Additionally, the modulus of elasticity of the compression spring 137 should have a lower limit value sufficient to open or break the lids 138 when the compression spring 137 is restored upon melting of the thermal cut-off composition due to an increase in the internal temperature of the battery.

Figure 7:
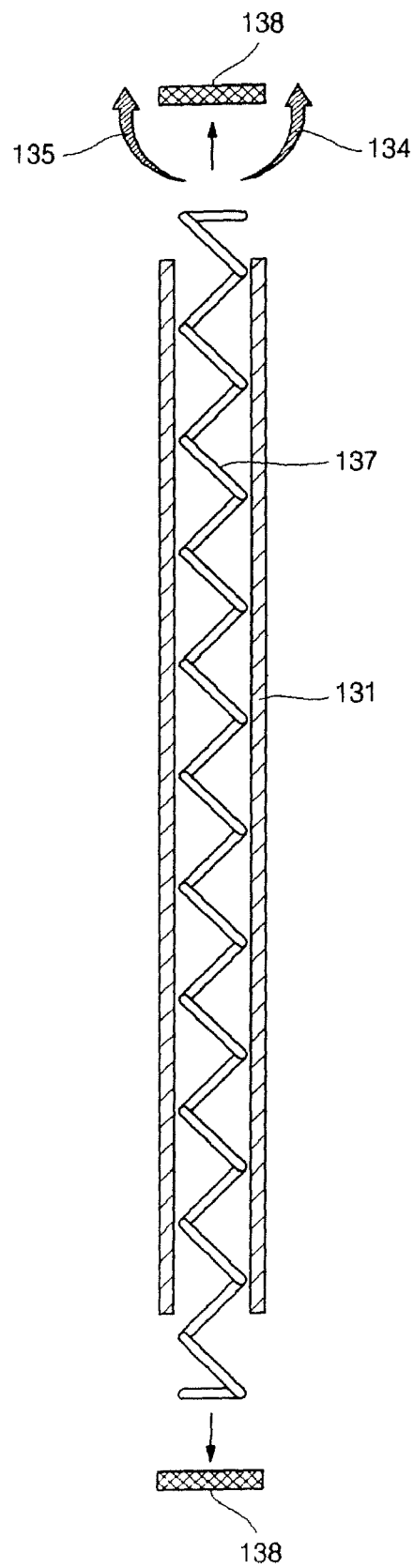
FIG. 7 is a sectional view showing the operation of the center pin of FIG. 5.

FIG. 7 is a sectional view of the center pin 130 where the compression spring 137 is restored. When the internal temperature of the battery increases to between about 80 and about 150° C. due to overcharge, the thermal cut-off composition 133 in the center pin 130 melts, and the compression spring 137 can no longer be maintained in its compressed state. Therefore, the compression spring 137 is restored and the lids 138 blocking the top and bottom ends of the center pin 130, open or break due to the elastic energy of the compression spring. The gasifier 134 and the flame retardant 135 in the center pin 130 are transferred to the cap assembly 400, resulting in deformation or breakage of the safety vent 410. In FIG. 7, the bold arrows indicate the discharge of the gasifier 134 and the flame retardant 135 to the exterior of the center pin 130. Nonlimiting examples of suitable gasification members include cyclohexyl benzene (CHB), biphenyl (BP), and the like. Nonlimiting examples of the flame retardant 135 include magnesium hydroxide-based materials, aluminum hydroxide-based materials and phosphate-based materials.

In another embodiment, the center pin has a structure in which both ends of the compression spring are coupled to bars, and the top and bottom ends of the body are blocked with lids. In such an embodiment, when the thermal cut-off composition surrounding the compression spring melts, the compression spring is restored and the bars coupled to both ends of the compression spring impact the lids, thereby opening the center pin.

A center pin according to still another embodiment of the present invention will now be described with reference to FIGS. 8a and 8b.

Figure 8A:
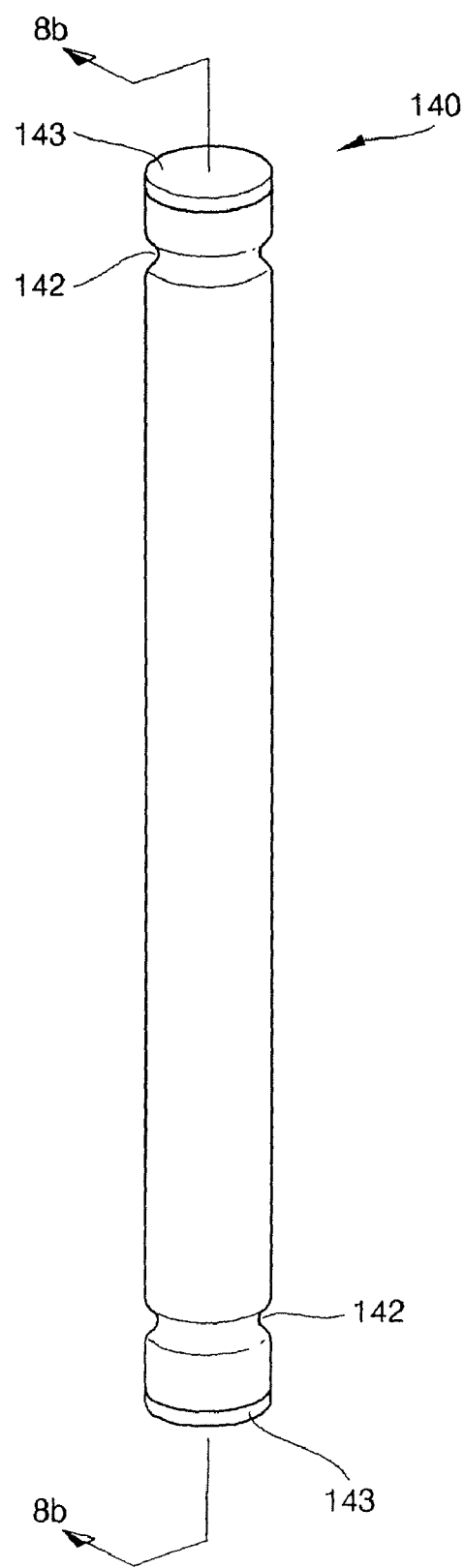
FIG. 8a is a perspective view of a center pin according to yet another embodiment of the present invention.
Figure 8B:
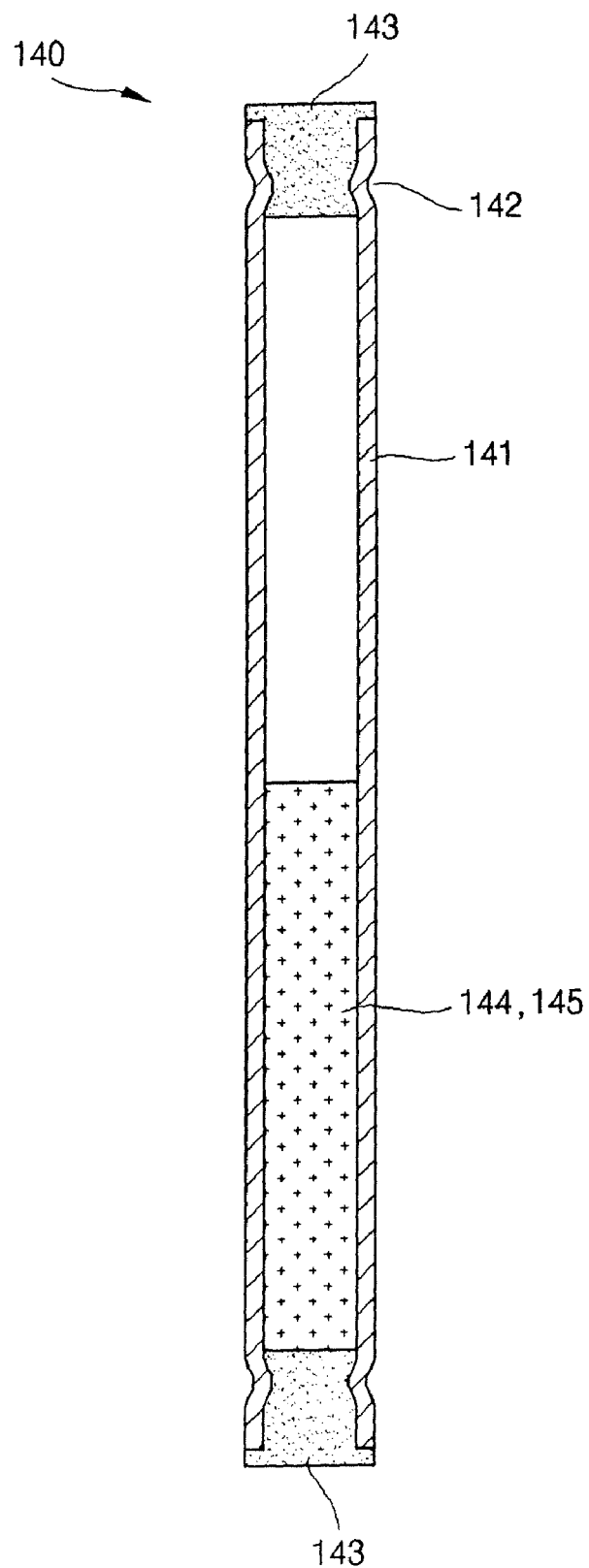
FIG. 8b is a sectional view of the center pin of FIG. 8a, taken along line 8b-8b.

As shown in FIGS. 8a and 8b, the center pin 140 according to still another embodiment of the present invention includes a body 141 and a blocker 143. The blocker 143 includes a thermal cut-off composition. The center pin 140 may further include a gasifier 144 and a flame retardant 145. The body 141 has indentations 142 near its top and bottom ends. The indentations fix the blocker 143 in place. The indentations 142 may comprise concave portions of the outer circumferential surface of the body 141, and convex portions on the inner circumferential surface of the body. Additionally, the indentations 142 may be substantially ring-shaped as shown in FIG. 8a. Although not shown, the indentations 142 may take any other suitable shape, such as a plurality of spots. The indentations 142 may be formed by pressing after the top and bottom ends of the body 141 are blocked with the blocker 143. Since the blocker 143 is fixed to the top and bottom ends of the body 141 by the indentations 142, the center pin 140 can be sealed tightly at low temperatures. When the internal temperature of the battery reaches about 80 to about 150° C., the blocker 143 melts and the center pin 140 opens. The center pin 140 may further include a gasifier 144 and a flame retardant 145.

A center pin according to yet another embodiment of the present invention will now be described with reference to FIGS. 9a and 9b.

Figure 9A:
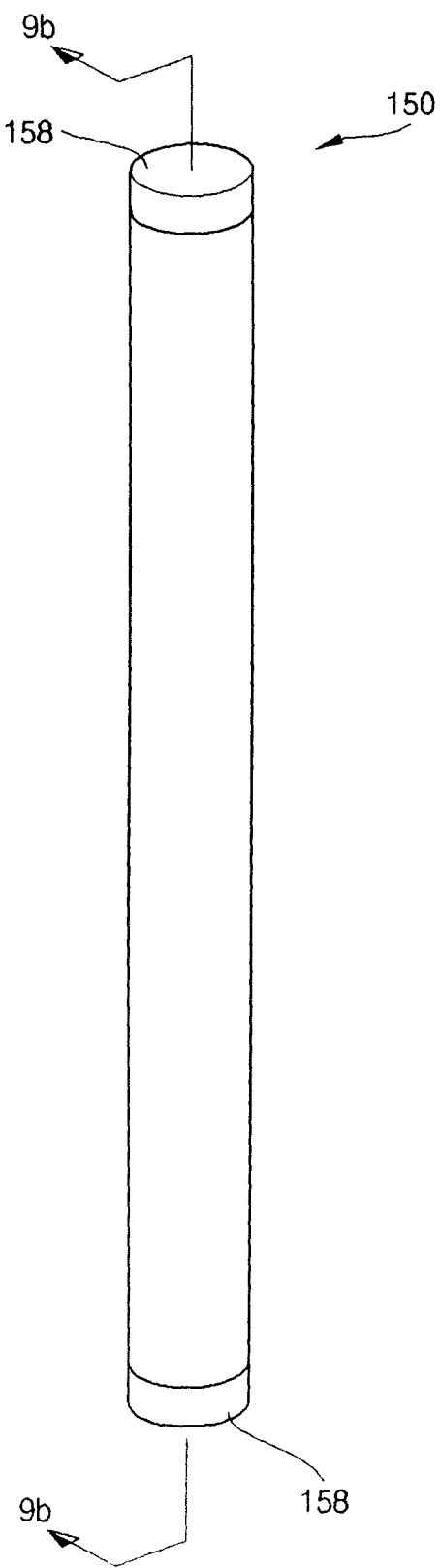
FIG. 9a is a perspective view of a center pin according to still yet another embodiment of the present invention.
Figure 9B:
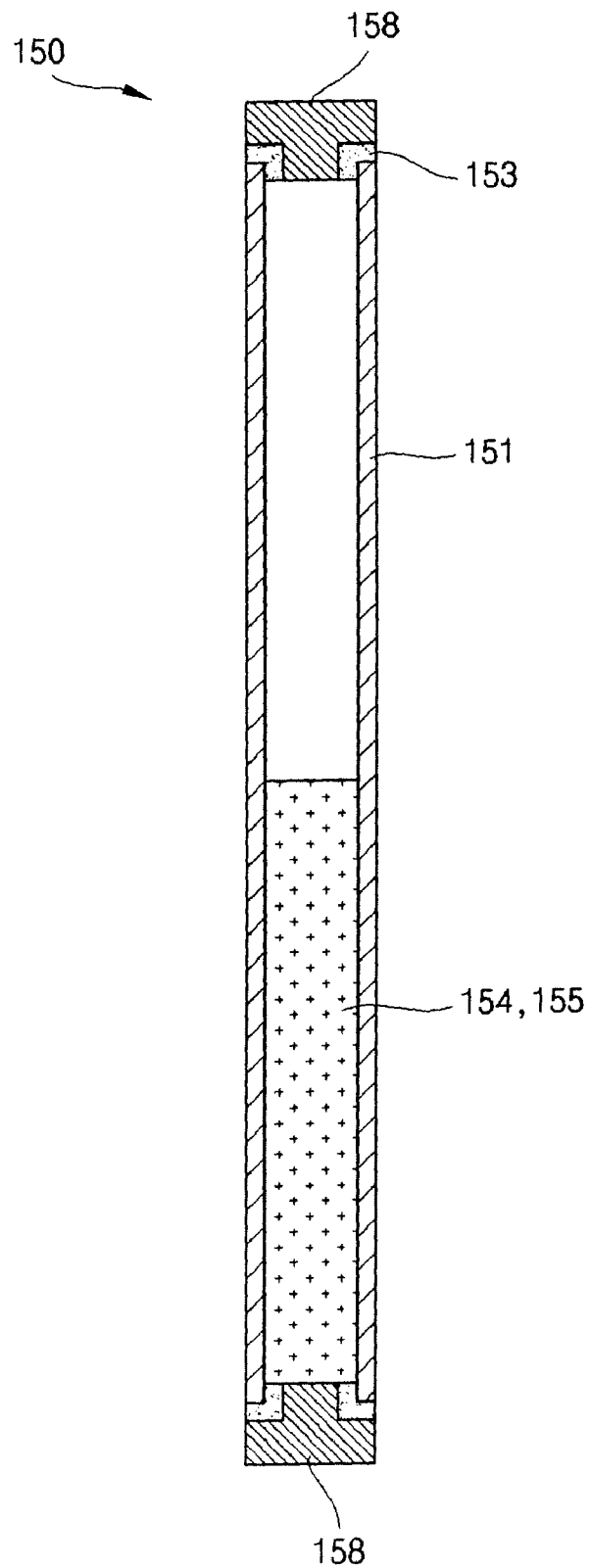
FIG. 9b is a sectional view of the center pin of FIG. 9a, taken along line 9b-9b.

As shown in FIGS. 9a and 9b, the center pin 150 according to yet another embodiment of the present invention includes a body 151 having a predetermined length and open top and bottom ends, lids 158 and sealing members 153 that block the top and bottom ends of the body 151. Additionally, the center pin 150 may further include a gasifier 154 and a flame retardant 155.

The top and bottom ends of the body 151 are blocked by the lids 158 and the sealing members 153. The lids 158 may comprise a polymer resin and have generally T-shaped cross-sections. A portion of each lid 158, has an outer diameter smaller than the inner diameter of the body 151 to leave room for a separate sealing member 153, which is positioned where the lid 158 is coupled with the body 151. In other words, the sealing members 153 are positioned in the spaces generated between the outer diameters of the lids 158 and the inner diameter of the body 151. As shown in FIG. 9b, the sealing members 153 may be positioned at the top and bottom ends of the body 151, and may be partially positioned in the inner circumferential surfaces of the upper and lower parts of the body 151. In other words, the sealing members 153 may be positioned in the portions where the lids 158 contact the body 151. Although not shown, the blocker 153 may be partially formed in the inner circumferential surface of the upper and lower parts of the body 151.

Nonlimiting examples of suitable materials for the lids 158 include polymer resins, such as polyethylene (PE), polypropylene (PP) and polyimide (PI). The sealing members 153 include thermal cut-off compositions that melt at a temperature within a specific temperature range. Therefore, when the internal temperature of the battery reaches between about 80 and about 150° C., the sealing members 153 melt and the lids 158 loosen, resulting in the opening of the top and bottom ends of the center pin 150.

A lithium rechargeable battery according to one embodiment of the present invention will now be described.

Referring to FIG. 3b, when the battery reaches an internal temperature of about 80 to about 150° C. or greater (e.g. 250° C.) due to overcharge, the blocker 113 (which includes the thermal cut-off composition) melts or explodes. Thus, the gasifier 114 is transferred to the exterior of the center pin 110, i.e. the gasifier is transferred to the electrolyte or electrode assembly. Upon such transfer, the gasifier generates a large amount of gas due to the rapid decomposition of the gasifier at a voltage of about 4 to about 4.5V or greater. The gas causes the safety vent 410 to deform or break more rapidly and allows the current interruption device 420 to break in order to interrupt the electric current and prevent an increase in the internal temperature of the battery.

Additionally, when the internal temperature of the battery reaches between about 80 and about 150° C., the blocker 113 including the thermal cut-off composition melts or explodes, and the flame retardant 115 is transferred to the exterior of the center pin 110. Such transfer of the flame retardant 115 significantly reduces the risk of battery ignition. The above description also applies to the embodiment illustrated in FIG. 4b.

Referring to FIGS. 5 and 7, when the internal temperature of the battery reaches between about 80 and about 150° C., the thermal cut-off composition 133 surrounding the compressed compression spring 137, melts and the compression spring elongates due to restoration force. The restoration force causes the spring 137 to impact the lids 138, thereby opening or breaking the lids 138. The gas generated by the decomposition of the gasifier contained in the center pin 130 and the gas generated from the electrolyte cause the safety vent 410 to deform or break due to the increased internal pressure, thereby breaking the current interruption device 420 which then interrupts the electric current and prevent an increase in the internal temperature of the battery.

As described above, the lithium rechargeable batteries according to the present invention have center pins with top and bottom ends blocked by thermal cut-off compositions. Thus, the void volume inside a bare cell is reduced during initial overcharge so that the safety vent can be operated promptly. Additionally, the thermal cut-off composition melts at a temperature within a specific temperature range, so that the composition melts upon increases in the internal temperature of the battery. This allows the center pin to serve as a gas discharge port. Upon discharge of the gas, the safety vent deforms, causing the current interruption device to break. Therefore, the lithium rechargeable batteries of the present invention have improved safety.

Exemplary embodiments of the present invention have been described for illustrative purposes only. Those skilled in the art will appreciate that various modifications, additions and substitutions to the described and illustrate embodiments without departing from the spirit and scope of the present invention as defined in the accompanying claims.

What is claimed is:

1. A lithium rechargeable battery comprising:
   an electrode assembly having a center pin, wherein the center pin comprises:
   a compressed compression spring positioned within a thermal cut-off composition,
   a body surrounding the compression spring,
   a top lid blocking a top end of the body, and
   a bottom lid blocking a bottom end of the body.

2. The lithium rechargeable battery as claimed in claim 1, wherein the thermal cut-off composition melts or explodes at a temperature ranging from about 50 to about 250° C.

3. The lithium rechargeable battery as claimed in claim 2, wherein the thermal cut-off composition melts or explodes at a temperature ranging from about 80 to about 150° C.

4. The lithium rechargeable battery as claimed in claim 1, wherein the thermal cut-off composition comprises a compound selected from the group consisting of 4-hydroxy-3-methoxybenzaldehyde, 1,3-diphenylbenzene, 1,4-dibromobenzene, triphenylmethane, 4,4'-methylenebis(benzeneamine), diphenylethanedione, pentanedioic acid, n-propyl-4-hydroxybenzoate, xanthene, 3,5-dimethylpyrazole, 1,3-benzenediol, N-phenyl-2-naphthylamine, N-phenylacetamide, 9H-fluorene, m-phenylenedibenzoate, and dihydro-2,5-furanedione.

5. The lithium rechargeable battery as claimed in claim 1, wherein the thermal cut-off composition comprises a combination of at least two organic compounds.

6. The lithium rechargeable battery as claimed in claim 5, wherein the organic compound is selected from the group consisting of 2H-1-benzopyran-2-one, n-butyl-4-hydroxybenzoate, phenylbenzoate, diphenylphthalate, 4-hydroxy-3-methoxybenzaldehyde, 1,3-diphenylbenzene, 1,4-dibromobenzene, triphenylmethane, 4,4'-methylenebis(benzeneamine), diphenylethanedione, pentadioic acid, n-propyl-4-hydroxybenzoate, xanthene, 3,5-dimethylpyrazole, 1,3-benzenediol, N-phenyl-2-naphthylamine, N-phenylacetamide, 9H-fluorene, m-phenylenedibenzoate, dihydro-2,5-furanedione, 2,5-pyrollidinedione, 3-pyridinecarboxamide, phthalic anhydride, p-toluene sulfonamide, dimethyl terephthalate, N-(4-methylphenyl)acetamide, hexanedioic acid, N-phenylbenzamide, 4,4'-dibromobiphenyl, mannitol, 4-(1,1-dimethylethyl)benzoic acid, N-(2,6-dimethylphenyl)acetamide, 2,4-dinitrobenzeneamine, 7-hydroxy-4-methylcoumarine, 5,5-diethyl-2,4,6(1H,3H,5H)-pyrimidinetrione, 1,4-diphenylbenzene, inocitol, 6-phenyl-1,3,5-pyrazine-2,4-diamine, 3,7-dihydro-1,3,7-trimethyl-1H-purine-2,6-dione, 1,1'-bi-2-naphthol, 4-hydroxy-3-methoxybenzoic acid, 2,3-dimethylanthraquinone, 2-phenylindole, 2-methylphenylacetic acid, 2-phenylbenzimidazole, 1,3,5-methyl-2,4,6-tris(3,5-di-t-butyl-4-hydroxybenzyl)benzene, hydantoin, 7-hydroxycoumarine, carbanilide, 1,5-dichloroanthraquinone, 1,1,1-tris(4-hydroxyphenyl)ethane, 1-aminoanthraquinone, 2,3,5,6-tetrabromo-p-xylene, 1,5-dihydroxynaphthalene, 2-quinoxalinol, 2,4-diamino-6-methyl-1,3,5-triazine, 7-chloro-4-hydroxyquinoline, alizarine, anthraquinone, 2,4-diamino-6-hydroxypyrimidine, 2-phenylbenzimidazole, 2-amino-4-hydroxy-6-methylpyrimidine, 4-amino-2,6-dihydroxypyrimidine, 2-amino-4,6-dihydroxypyrimidine and uracil.

7. The lithium rechargeable battery as claimed in claim 1, wherein the top and bottom lids can be opened or broken by a restoration force of the compression spring.

8. The lithium rechargeable battery as claimed in claim 1, wherein each of the top and bottom lids comprise a polymer resin.

9. The lithium rechargeable battery as claimed in claim 1, wherein the body comprises a gasifier, wherein the gasifier decomposes at a predetermined voltage range to generate gas.

10. The lithium rechargeable battery as claimed in claim 9, wherein the gasifier comprises cyclohexyl benzene (CHB).

11. The lithium rechargeable battery as claimed in claim 1, wherein the body comprises a flame retardant.

12. The lithium rechargeable battery as claimed in claim 11, wherein the flame retardant comprises a material selected from the group consisting of magnesium hydroxide-based materials, aluminum hydroxide-based materials and phosphate-based materials.

13. The lithium rechargeable battery as claimed in claim 1, wherein the compression spring is inserted into the thermal cut-off composition by insert injection molding.

14. The lithium rechargeable battery as claimed in claim 1, wherein a surface of the thermal cut-off composition is coated with a material selected from the group consisting of polyethylene (PE), polypropylene (PP) and polyimide (PI).

* * * * *

UNITED STATES PATENT AND TRADEMARK OFFICE
CERTIFICATE OF CORRECTION

PATENT NO. : 7,749,642 B2
APPLICATION NO. : 12/470440
DATED : July 6, 2010
INVENTOR(S) : Seok-Gyun Chang et al.

It is certified that error appears in the above-identified patent and that said Letters Patent is hereby corrected as shown below:

Column 14, Claim 6, line 51  Delete "-methyl-"
Insert -- -trimethyl- --

Signed and Sealed this
Twenty-fourth Day of May, 2011

David J. Kappos
*Director of the United States Patent and Trademark Office*